US012752425B2

(12) United States Patent
Schwinn et al.

(10) Patent No.: US 12,752,425 B2
(45) Date of Patent: Oct. 6, 2026

(54) IDENTIFICATION OF ERROR CAUSES AT THE COMMAND LEVEL IN PROCESSES

(71) Applicant: KUKA Deutschland GmbH, Augsburg (DE)

(72) Inventors: Jonas Schwinn, Diedorf (DE); Manuel Kaspar, Koenigsbrunn (DE)

(73) Assignee: KUKA Deutschland GmbH (DE)

( * ) Notice: Subject to any disclaimer, the term of this patent is extended or adjusted under 35 U.S.C. 154(b) by 196 days.

(21) Appl. No.: 18/716,619

(22) PCT Filed: Nov. 29, 2022

(86) PCT No.: PCT/EP2022/083696
§ 371 (c)(1),
(2) Date: Jun. 5, 2024

(87) PCT Pub. No.: WO2023/104591
PCT Pub. Date: Jun. 15, 2023

(65) Prior Publication Data

US 2025/0033213 A1 Jan. 30, 2025

(30) Foreign Application Priority Data

Dec. 7, 2021 (DE) ............... DE 10 2021 213 918.3

(51) Int. Cl.
*B25J 9/16* (2006.01)

(52) U.S. Cl.
CPC .................................. *B25J 9/1674* (2013.01)

(58) Field of Classification Search
CPC ...... G05B 19/4068; G05B 2219/33296; G05B 2219/35304; G05B 2219/35291; G05B 2219/35288; B25J 9/1674
See application file for complete search history.

(56) References Cited

U.S. PATENT DOCUMENTS

| | | | | |
|---|---|---|---|---|
| 2012/0185728 A1* | 7/2012 | Guo | F24F 11/38 | 714/E11.159 |
| 2015/0148956 A1* | 5/2015 | Negishi | B25J 9/163 | 700/253 |

(Continued)

FOREIGN PATENT DOCUMENTS

| | | | |
|---|---|---|---|
| DE | 102019003382 A1 | 11/2019 | |
| DE | 112019006789 T5 | 9/2023 | |
| EP | 1189126 A2 | 3/2002 | |

OTHER PUBLICATIONS

German Patent Office; Search report in related German Patent Application No. 10 2021 213 918.3 dated Mar. 2022; 7 pages.

(Continued)

*Primary Examiner* — Stephen Holwerda
(74) *Attorney, Agent, or Firm* — Dorton & Willis, LLP

(57) ABSTRACT

A method for evaluating and/or monitoring a process, in particular a robotic process, includes detecting at least one data time series that describes at least one parameter of the process, and wherein the data time series is created by the process, which executes a process program with process commands, and wherein the at least one data time series is assigned to a part of the process program, in particular a process command or a part of the process commands of the process program. The method further includes determining a result using a first algorithm or at least a part of an algorithm based on the at least one data time series, wherein the result describes a state of the process, and wherein the result can be assigned to the part of the process program, in particular the process command or the part of the process commands of the process program.

16 Claims, 3 Drawing Sheets

(56) References Cited

U.S. PATENT DOCUMENTS

| | | | | |
|---|---|---|---|---|
| 2015/0149392 | A1* | 5/2015 | Bolich | G06N 5/02 706/11 |
| 2019/0221037 | A1* | 7/2019 | Sugaya | B25J 9/163 |
| 2020/0089209 | A1* | 3/2020 | Amemiya | B25J 9/1674 |
| 2022/0016770 | A1 | 1/2022 | Matsuoka et al. | |
| 2024/0351209 | A1* | 10/2024 | Graabæk | B25J 9/1674 |

OTHER PUBLICATIONS

European Patent Office; Search Report in related International Patent Application No. PCT/EP2022/083696 dated Mar. 3, 2023; 2 pages.

* cited by examiner

IDENTIFICATION OF ERROR CAUSES AT THE COMMAND LEVEL IN PROCESSES

CROSS-REFERENCE TO RELATED APPLICATIONS

This application is a national phase application under 35 U.S.C. § 371 of International Patent Application No. PCT/EP2022/083696, filed Nov. 29, 2022 (pending), which claims the benefit of priority to German Patent Application No. DE 10 2021 213 918.3, filed Nov. 7, 2021, the disclosures of which are incorporated by reference herein in their entirety.

TECHNICAL FIELD

The present invention relates to a method for evaluating and/or monitoring a process, in particular a robotic process, as well as to a system and a computer program or computer program product for carrying out the method.

BACKGROUND

Traditionally, robotic processes are monitored and any errors that occur are analyzed using data analysis. In particular, positions, forces or currents are recorded as time series and evaluated using data analysis methods. This generally detects errors and prevents subsequent errors.

The simplest form of time series analysis is conventional event detection. Here, time series are checked against manually set, fixed limits (logical or numerical). Although these tests can be performed very quickly, they require expert knowledge of the process, are complex to program, and cannot detect complex events. Time series analyses using machine learning have up to now been carried out either on the entire time series of the process or on individual time segments and points in time. These do not allow any conclusions to be drawn about an underlying program or even program commands. In such cases, trial-and-error optimizations are often used, which are time-consuming. It is therefore difficult to optimize a robot program based on detected errors.

SUMMARY

The object of the present invention is to improve processes, in particular robotic processes, preferably to remedy the above problem.

This object is achieved by a method, a system, and computer program or computer program product for carrying out a method as described herein.

According to one embodiment of the present invention, a method for evaluating and/or monitoring a robot application comprises the step: detecting at least one data time series. The at least one data time series describes or represents at least one parameter of the process, in particular a force, a speed, an acceleration, a pose, a current, or a voltage. The data time series is created by the process, which executes a process program with process commands. The at least one data time series is assigned to a part of the process program, in particular to a process command or to a part of the process commands of the process program.

In one embodiment, a process can be a production process with one or more production or process systems, a process within one of the production or process systems, a process of a single machine, in particular a robot, or a process of a part of a production system, a machine or a robot. A process can refer in particular to the instantiation of a program for its execution, in particular within a computer system and/or its concrete execution. In particular, a process can be carried out automatically and/or repeatedly or repeatably. A robotic process can in particular be a process that comprises a robot or has a robot.

In one embodiment, a parameter may comprise, in particular be, a geometric indication concerning a process system, such as in particular a robot. This includes in particular a position and/or a pose of the process system or a part of the process system. Additionally or alternatively, a parameter may comprise a dynamic indication, such as in particular a speed or an acceleration of at least one component of a process system. Furthermore, a parameter can additionally or alternatively comprise at least one physical quantity, such as in particular forces, currents, or voltages.

The method further comprises: determining of a result by a first algorithm or by at least a part of an algorithm, based on the at least one data time series. The result describes a state of the process. The result can also be assigned to the part of the process program, in particular the process command or the part of the process commands of the process program; in particular, the result is assigned to the part of the process program, in particular the process command or the part of the process commands of the process program.

In one embodiment, this can enable the method to use the result to evaluate and/or monitor the process. Furthermore, in this way the integrity of the process can be evaluated and it can be enabled that the process can be controlled based on the result. Advantageously, the process can be optimized on the basis of the result, particularly advantageously the process program, in particular process commands or parts of the process commands of the process program. Furthermore, it can be made possible in particular to draw conclusions about dependencies in the process program.

According to one embodiment, the aim of the invention can be to use a method that can simulate the structures of a process, in particular a robotic process, and thus make it possible to make statements about the entire process and at the same time to assess and/or predict the execution of in particular each command of the underlying process program.

According to one embodiment, the method can further comprise: determining an intermediate result by the at least one part of the algorithm or by at least one other part of the algorithm or by a second algorithm based on the at least one data time series. The at least one part of the algorithm or the at least one other part of the algorithm or the second algorithm can receive the at least one data time series in order to determine the intermediate result. The intermediate result can be an interpretable intermediate result or an uninterpretable intermediate result. An interpretable intermediate result is understood here as an intermediate result that can be read or understood by a user. In particular, using the intermediate result the user can (already) derive a state of the process and/or recognize a classification of the process. The intermediate result can in particular describe an assignment to a predetermined process label. A predetermined process label as used herein can in particular be a state of a part of the process chain defined by a user. In particular, a robot or a system can receive the status "OK" or "NOK" depending on or corresponding to the (development of the) data time series. In particular, the process labels can represent continuous states, such as values between 0.0 and 1.0, or the process labels can represent states that are in particular binary or correspond to a comparable discrete description system, such as discrete labels with in particular more than two classes, further particularly as in the case of a process with different error classes. These states can be specifically named as process labels, such as “OK” or “NOK” or “successful.” In particular, process labels can describe the states in a process, such as “product X picked up” or “product X not picked up,” “part Y assembled” or “part Y not assembled,” or the like. In particular, states for process labels can be identified using machine learning and/or defined manually by a user. In embodiments, a state can in particular be a future state. In other words, a state can also be a prediction of a state.

In particular, an intermediate result can be assigned to the part of the process program, in particular the process command or the part of the process commands of the process program; in particular, the result is assigned to the part of the process program, in particular the process command or the part of the process commands of the process program.

In particular, the at least one part of the algorithm or the at least one other part of the algorithm or the second algorithm can be trained on known pairs of process labels and data time series. The at least one part of the algorithm or the at least one other part of the algorithm or the second algorithm can then determine a prediction of the process labels, especially in the case of unknown data time series.

According to one embodiment, this makes it possible for errors in the process program or in process commands to be detected and/or marked. Advantageously, this makes it possible to provide information about the entire process.

According to one embodiment, a process program can consist of a plurality of commands, such as in particular for a robotic process (lin, ptp, ptp, open_gripper, lin, . . . ), and alternatively or additionally can consist of activation or deactivation of functions of device(s) mounted on a robot by means of commands in particular, such as in particular switching on a welding device or the like. In particular, the commands can be in any sort order. This sorting can take into account nesting within the program, especially in the case conditional statements (“f-causes”) or branchings. Data time series are recorded in particular during the execution of the process commands. Data time series arranged one after the other can in particular result in an overall data time series.

According to an embodiment of the present invention, the determination of the result by the first algorithm or by the at least one part of an algorithm can in addition or alternatively be based on the intermediate result. The first algorithm or the at least one part of the algorithm can in addition or alternatively receive the intermediate result.

In one embodiment, the intermediate result can comprise an assignment of an (unknown) data time series to the part of the process program, in particular the process command or the part of the process commands of the process program. In one embodiment, this makes it possible to display that part of the process program, in particular the process command or the part of the process commands of the process program, that is the basis of a detected data time series, in particular on a user interface. Advantageously, the execution of the process program can be monitored in real time or at least substantially in real time via the user interface, in particular by a user.

According to an embodiment of the present invention, the second algorithm can be a machine learning algorithm. The machine learning can comprise: training the second algorithm on the process labels (y) based on the at least one data time series in order to determine an intermediate result. In particular, for each part of the process program, in particular each process command or each part of the process commands of the process program, a separate and/or corresponding second algorithm can be created (automatically) which is trained on data time series associated with the execution of the part of the process program, in particular the process command or the part of the process commands of the process program.

This makes it possible for the second algorithm to advantageously assign the part of the process program, in particular the process command or the part of the process commands of the process program, to a process label (y) and a data time series. In one embodiment, this makes it possible to classify a data time series with a process label (y). Advantageously, the classification can make it possible for the data time series to be assigned to the part of the process program, in particular the process command or the part of the process commands of the process program, which are responsible for the data time series. In other words, the second algorithm can advantageously make it possible in particular to enable determination of an (in particular successful or unsuccessful) execution of the part of the process program, in particular of the process command or the part of the process commands of the process program.

According to an embodiment of the present invention, the first algorithm can be based on machine learning. The machine learning can comprise training the first algorithm with the intermediate result of the at least one part of the algorithm or the at least one other part of the algorithm or of the second algorithm on the process labels (y).

In one embodiment, this makes it possible for a data time series to be associated with the part of the process program, in particular the process command or the part of the process commands of the process program, in particular across the algorithm and/or algorithms. Furthermore, in particular a result can be associated with the part of the process program, in particular the process command or the part of the process commands of the process program. That is, the first algorithm can in particular determine a result that can be traced back to the part of the process program, in particular the process command or the part of the process commands of the process program. In particular, the result can advantageously enable a statement to be made about the quality of the process programming.

According to one embodiment of the present invention, the at least one data time series can be selected from an overall data time series of the process. In particular, the overall data time series can comprise one or more data time series of the process. A data time series that is selected from an overall data time series can in particular be a data time series of the plurality of data time series of the overall data time series and/or a data time series that corresponds to a (temporal) part of the overall data time series.

In particular, in certain cases, data time series may not be recorded for the one part of the process program, in particular the one process command or the one part of the process commands of the process program. However, in these cases it may be possible to obtain a data time series for multiple parts of the process program, in particular for multiple consecutive process commands or for multiple consecutive parts of process commands of the process program. These data time series (like the data time series that were obtained for the one part of the process program, in particular the one process command or the one part of the process commands of the process program) can be comprised in an overall data time series. A corresponding data time series can therefore be selected from an overall data time series.

As a result, in one embodiment, parts of a process that were recorded (or obtained) in an overall data time series can advantageously be associated with the one part of the process program, in particular the one process command or the one part of the process commands of the process program, so that an error in the one part of the process program, in particular the one process command or the one part of the process commands of the process program, can be determined. Advantageously, this makes it possible to optimize a process program.

According to an embodiment of the present invention, the method can further comprise: analysis of the intermediate result by an anomaly detection algorithm. The method can further comprise determination of an anomaly result (by the anomaly detection algorithm), wherein the anomaly result describes an error in the execution of the part of the process program, in particular in the execution of the process command or the part of the process commands of the process program. In particular, the anomaly detection algorithm can enable detection of deviations from the training data of the anomaly detection method per intermediate result, especially in unsupervised learning or self-supervised learning. In particular, if training was carried out exclusively with "OK" data, in the event of a deviation or deviations the hypothesis can be made that these deviations are "NOK" cases. This can make it possible to predict "NOK" cases for a single process command. This is not possible in particular in methods with supervised learning, since in general in these supervised learning cases there are no labels for process commands, but only global labels. Accordingly, with global labels, from a global OK label it can be concluded that all process commands were OK. However, with a global "NOK" label it is not possible to infer a single "NOK" process command. In particular, the anomaly detection algorithm can make a prediction about the process based on the process labels (y). In particular, the anomaly result can be a process label (y), in particular a prediction for a process label (y), in particular for a data time series or a plurality of data time series. The anomaly detection algorithm can in particular be designed as a neural network, as a principal component analysis (PCA), and/or as a k-means algorithm (or the like). The anomaly detection algorithm can be trained in particular with autoencoders ("unsupervised learning").

In one embodiment, this makes it possible in particular to detect and/or predict an anomaly at an early stage in the course of the process. Advantageously, the anomaly result can be associated with the one part of the process program, in particular the one process command or the one part of the process commands of the process program. The (additional) anomaly result can in particular make it possible for a prediction about (in particular) the process to be richer in content than, for example, a prediction with (only) intermediate result(s) or result.

According to one embodiment of the present invention, the method further comprises: outputting the result and/or the intermediate result via a user interface. Alternatively or additionally, the procedure can comprise evaluating the process based on the intermediate result and/or the result. Further alternatively or additionally, the method can comprise controlling the process, in particular the robotic process, based on the intermediate result and/or the result.

In particular, the result and/or the intermediate result can be output via a user interface, in particular acoustically, haptically, graphically (optically), or in combination. In particular, outputting can be done on all commonly used user interfaces. This includes in particular graphic representation(s) on a screen, in augmented reality, or in virtual reality.

The evaluation can be an evaluation that classifies the process into predefined categories, especially outside the (defined) process labels (y). The controlling of the process can take place in particular based on the intermediate result and/or the result. Additionally or alternatively, controlling the process can be based on evaluating the process.

According to one embodiment of the present invention, outputting comprises: representing the result, in particular with a graphical representation, in a flow chart of the process. In particular, a flow chart can be created automatically for the part of the process program or the part of the process commands of the process program.

According to one embodiment, this makes it possible for a user to recognize more quickly where an error may occur or has occurred in the process program. Advantageously, in one embodiment this can make it possible to improve the process program more easily.

According to one embodiment of the present invention, the detection and/or analysis (determination of an intermediate result and/or a result and/or an anomaly result) of the at least one data time series can be carried out centrally and/or decentrally.

In particular, according to one embodiment the computing load of the individual steps can be distributed centrally and/or decentrally. In particular, according to one embodiment, a process controller can take over individual steps of the process, and in particular the intermediate result and/or the result can be published on an Open Platform Communications Unified Architecture (OPC UA) server, or the like. In particular, these steps or other steps of the method can be carried out on an edge controller, in particular decentrally, or in the cloud, in particular centrally. Decentralized and/or centralized processing of the method steps can depend in particular on the process architecture and/or the process components. In particular, the processing can be dynamically distributed across central and/or decentralized computing units and/or executed in parallel.

In particular, according to one embodiment, the algorithms for determining an intermediate result and the algorithms for determining a result can be housed on different systems. In particular, the evaluation of the individual commands, i.e., in particular the determination of an intermediate result, can be carried out on a process controller, in particular on a robot controller. This intermediate result(s) can be published in particular on an OPC UA server. In particular, a higher-level system, such as a system on an edge controller or in a cloud, can then aggregate the intermediate results in order to then determine a result.

According to an embodiment of the present invention, the method can further comprise: detecting an overall data time series if detecting the data time series with an assignment to a process command or process commands is not possible. Furthermore, the method can comprise decomposing an overall data time series into data time series using a decomposition algorithm. In particular, the overall data time series can describe at least one parameter of the process. Furthermore, the overall data time series can be created in particular by the process that executes a process program with process commands.

According to one embodiment of the present invention, the decomposition algorithm is a machine learning algorithm.

In particular, the decomposition algorithm can decompose an overall data time series into data time series in such a way that an assignment of the data time series to the part of the process program, in particular the process command or the part of the process commands of the process program, can be made possible.

According to one embodiment of the present invention, a system for identifying error causes in a process, in particular in a robotic process, is designed to carry out a method as described in embodiments above and/or comprises:

means for detecting at least one data time series, wherein the at least one data time series describes at least one parameter of the process, and wherein the data time series is created by the process, which executes a process program with process commands, and wherein the at least one data time series is assigned to a part of the process program, in particular a process command or a part of the process commands of the process program;

means for determining a result by means of a first algorithm or by means of at least a part of an algorithm, based on the at least one data time series, wherein the result describes a state of the process, and wherein the result can be assigned to the part of the process program, in particular the process command or the part of the process commands of the process program.

In one embodiment, the system or its means comprises: means for determining an intermediate result by the at least one part of the algorithm or by at least one other part of the algorithm or by a second algorithm based on the at least one data time series, wherein the at least one part of the algorithm or the at least one other part of the algorithm or the second algorithm receives the at least one data time series, and wherein the intermediate result is an interpretable intermediate result or an uninterpretable intermediate result and wherein the intermediate result describes an assignment to a predetermined process label.

In one embodiment, the system or its means can be configured such that the determination of the result by the first algorithm or by the at least one part of an algorithm is further or alternatively based on the intermediate result, and wherein the first algorithm or the at least one part of an algorithm further or alternatively receives the intermediate result.

In one embodiment, the system or its means can be configured such that the second algorithm is a machine learning algorithm.

In one embodiment, the system or its means comprises: means for training the second algorithm on the process labels (y) based on the at least one data time series in order to determine an intermediate result.

In one embodiment, the system or its means can be configured such that the first algorithm is a machine learning algorithm.

In one embodiment, the system or its means comprises: means for training the first algorithm with the intermediate result of the at least one other part of the algorithm or the second algorithm on the process labels (y).

In one embodiment, the system or its means can be configured to select the at least one data time series from an overall data time series of the process.

In one embodiment, the system or its means comprises: means for analyzing the intermediate result by an anomaly detection algorithm, and means for determining an anomaly result, wherein the anomaly result describes an error in the execution of the part of the process program, in particular in the execution of the process command or the part of the process commands of the process program.

In one embodiment, the system or its means comprises: means for outputting the result and/or the intermediate result via a user interface; and/or means for evaluating the process based on the intermediate result and/or the result; and/or means for controlling the process, in particular the robotic process, based on the intermediate result and/or the result.

In one embodiment, the system or its means comprises: means for displaying the result, in particular with a graphical representation, in a flowchart of the process.

In one embodiment, the system or its means can be configured to detect and/or determine the result and/or the intermediate result and/or the anomaly result of the at least one data time series centrally and/or decentrally.

In one embodiment, the system or its means comprises: means for detecting an overall data time series if detecting the data time series with an assignment to a process command or process commands is not possible; and means for decomposing an overall data time series into data time series by a decomposition algorithm, wherein the overall data time series describes at least one parameter of the process, and wherein the overall data time series is created by the process that executes a process program with process commands.

In one embodiment, the system or its means can be configured such that the decomposition algorithm is a machine learning algorithm.

In one embodiment, one or more, in particular all, steps of the method are performed completely or partially automatically, in particular by the system or its means.

A system and/or a means within the meaning of the present invention may be designed in hardware and/or in software, and in particular may comprise at least one data-connected or signal-connected, in particular digital, processing unit, in particular microprocessor unit (CPU), graphic card (GPU) having a memory and/or bus system or the like and/or one or multiple programs or program modules. The processing unit may be designed to process commands that are implemented as a program stored in a memory system, to detect input signals from a data bus and/or to output output signals to a data bus. A storage system may comprise one or a plurality of, in particular different, storage media, in particular optical, magnetic, solid-state, and/or other non-volatile media. The program may be designed in such a way that it embodies or is capable of carrying out the methods described herein, so that the processing unit is able to carry out the steps of such methods and thus, in particular, is able to operate the robot. In particular, a means within the meaning of the present invention can comprise, in particular can be, a programming language and/or program library. In one embodiment, a computer program product can comprise, in particular can be, a storage medium, in particular computer-readable and/or non-volatile, for storing a program or instructions or with a program stored thereon or with instructions stored thereon. In one embodiment, execution of said program or instructions by a system or controller, in particular a computer or an arrangement of multiple computers, causes the system or controller, in particular the computer or computers, and/or a computing unit, to carry out a method described herein or one or more steps thereof, or the program or instructions are configured to do so.

According to one embodiment of the invention, a computer program or computer program product is provided, the computer program or computer program product comprising instructions, in particular stored on a computer-readable and/or non-volatile storage medium, which, when executed by one or more computers or a system as described herein cause the computer(s) or the system to carry out a method as described herein.

According to one embodiment, a part of an algorithm can determine a result. Furthermore, another part of the algorithm can determine an intermediate result.

Alternatively, according to one embodiment, a first algorithm can determine a result and a second algorithm can determine an intermediate result.

Alternatively, according to one embodiment a result can be determined by an algorithm, in particular without determining an intermediate result.

The terms "first algorithm" and "second algorithm" used herein do not refer to a chronological sequence of the algorithms.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
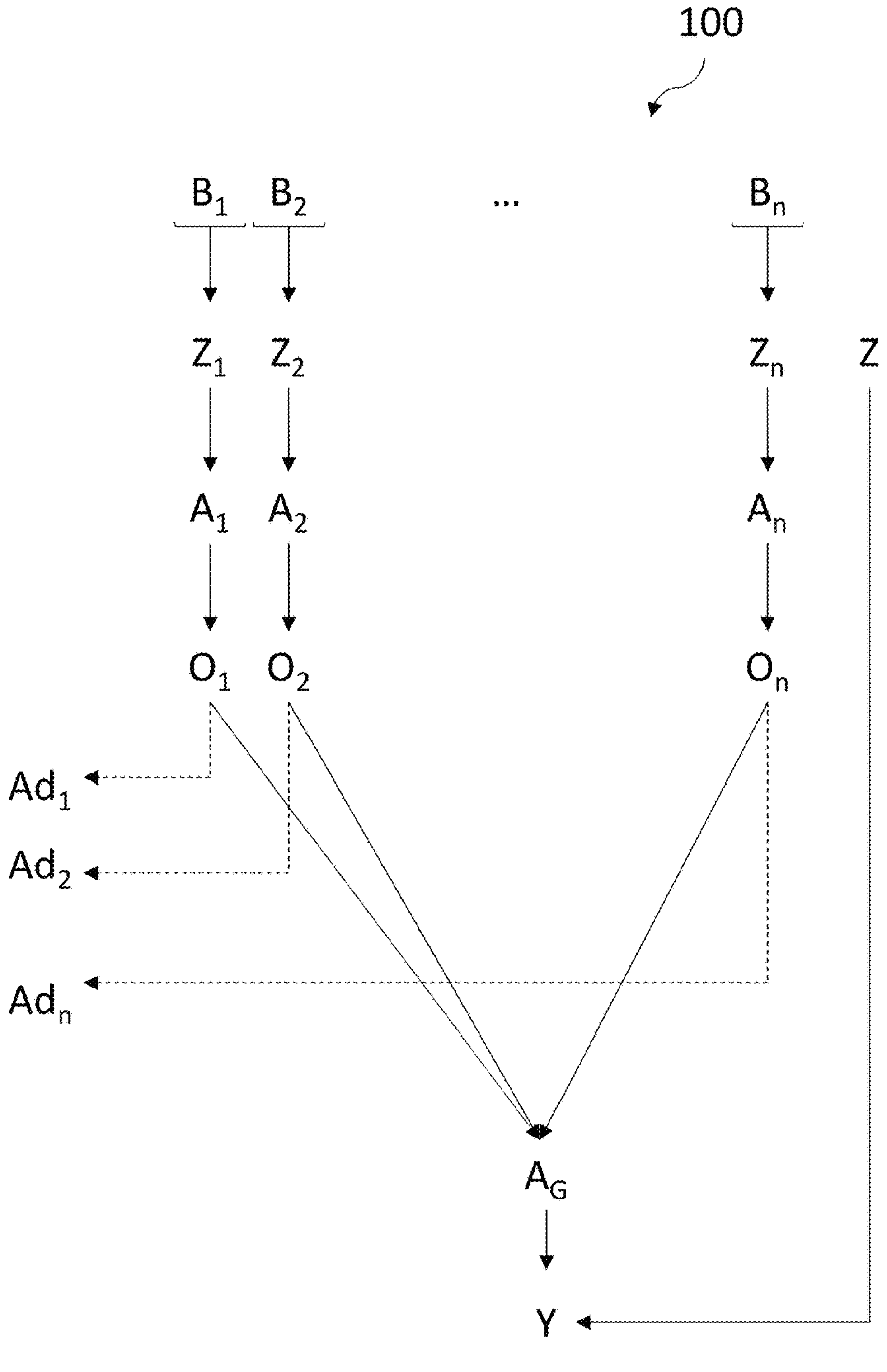
FIG. 1 schematically illustrates a flowchart of a method according to an embodiment of the present disclosure.

FIG. 1 schematically illustrates a method 100 for evaluating and/or monitoring a process, in particular a robotic process. Processes are usually subject to a flow schema and can usually be monitored in particular by sensors. Such monitoring, or an evaluation derived in particular from the sensor data, usually does not allow any inferences to be drawn about the programming of the process.

With the method 100 shown schematically in FIG. 1, inferences can advantageously be drawn about the programming of a process, in particular about the quality of the programming of a process.

In FIG. 1, B1, B2 to Bn stand for examples of commands in a process program or in a part of a process program. Each command B1 to Bn is assigned a first algorithm or at least a part of a first algorithm or a second algorithm A1, A2 to An. The intermediate results O1, O2 to On determined by the first algorithm or at least a part of the first algorithm or the second algorithm therefore result, as shown by way of example, for the data time series Z1, Z2 to Zn and can be assigned (in particular by an algorithm A1 to An) to a command B1, B2 to Bn.

$A_G$ schematically represents the at least one part of an algorithm or the first algorithm, which determines a result in particular based on the intermediate result. The result Y can in particular be an assignment to at least one process label (y) that evaluates a process and/or is used to monitor the process. Z refers here, for example, to an overall data time series Z, to which a process label (y) can be assigned as result Y or to which a process label (y) is assigned as result Y.

In particular, it can be assumed that the commands are in any sort order B1, B2, . . . Bn. If the incorrect execution of a command Bi (i stands for any command from the commands B1 to Bn) is now determined or predicted, the method can mark the incorrect execution of the command Bi, in particular on a user interface, in particular in a flowchart of the process.

Advantageously, this can enable the user to find an error in a more well-directed manner. It can also be particularly advantageous that the structure of the algorithm (first algorithm and second algorithm, a part of the algorithm and another part of the algorithm or an algorithm) enables a distributed detection (recording) of data time series and/or can enable a distributed determination of the result and/or intermediate result (evaluation).

In particular, data time series Z1 to Zn can be generated by a robot executing a robot program. In particular, multiple robots or (also) other types of machines can be involved which generate data time series Zi, or whose parameters can be recorded as data time series, in particular with sensors.

In particular, a robot program can consist of a multiplicity of commands B1 to Bn. In particular, these can be in any sorting order. In particular, the sorting can take into account the nesting within the program, in particular by using a flow graph. The flow graph can be used to draw inferences about dependencies in the program, in particular after determining an intermediate result and/or a result.

In particular, data time series can be detected or recorded during the execution of a command Bi. The detected data time series, in particular when arranged one after the other, form a complete data time series Z of the (observed) process.

If the separate recording of data time series Zi in particular per command Bi is not possible, but an overall data time series Z is available for the process, then a further machine learning algorithm can be used to decompose the overall data time series Z into the data time series Zi. In particular, this algorithm can be trained with overall data time series Z (and data time series Zi) from multiple processes.

In particular, an algorithm Ai can be created for each command Bi, as shown in FIG. 1. In particular, the algorithms Ai can form the first layer of a hierarchy. Each algorithm Ai can receive a data time series Zi as input and determine or generate an intermediate result (output) Oi based on the Zi. This intermediate result (output) Oi can take multiple forms, in particular an interpretable or an uninterpretable form. A second layer can in particular represent a further algorithm $A_G$, whose inputs can in particular be the outputs Oi of the first layer. From this, $A_G$ can in particular determine a prediction Y for the (observed) overall data time series Z.

Further particularly, the following possibilities can result for training the hierarchy shown as an example. In particular, the Ai can be trained individually in the style of supervised learning on process labels (y). Subsequently, $A_G$ in particular can also be trained on the process labels (y). The Ai can be pre-trained in particular on the process labels (y) and then the entire hierarchy can be trained together.

Alternatively or additionally, the Ai can be trained using separate process labels for, for example, each data time series Zi. $A_G$ can be trained in particular on the process labels (y).

Alternatively or additionally, the A1 can in particular be trained using autoencoders ("unsupervised learning"). In particular, if Ai and $A_G$ are designed as a common neural network, in particular during supervised training an additional condition can be set, in particular via the loss function of the neural network, which condition requires that the intermediate results must be normally distributed (variational autoencoder). In one embodiment, this makes it possible in particular to generate a code for the intermediate layer which can then be used by $A_G$.

According to one embodiment, a hierarchy can in particular be dependent on the choice of algorithms and/or the (selected) outputs Oi. In particular, additional layers can be used.

Intermediate results (outputs) Oi can in particular be interpretable outputs Oi. This can be the case in particular if the algorithms Ai are regression and/or classification in the context of supervised learning.

In addition, confidence intervals for the intermediate results (outputs) Oi can be estimated or determined, in particular by dropout sampling, in particular with mean and standard deviation.

Intermediate results (outputs) Oi can in particular be vectors that are in particular not interpretable, but can contain more information for in particular the second layer compared to interpretable intermediate results Oi.

The intermediate results (outputs) Oi can be published on an OPC UA server so that they can be requested by other (adjacent) systems. In particular, the process label "OK" can be published assigned to a data time series Z1, the process label "NOK" to a second data time series Z2, and the process label "NOK" to the overall process Z. These process labels can be traced back to commands B1 and B2 in particular. For B2, it can therefore be recognized in particular that the command was not executed or was not executed correctly, or that the process result to be achieved by command B2 was not achieved or was not achieved sufficiently. A user can be enabled to identify B2 more easily as the cause of an overall process that does not meet the requirements (in particular those defined by the user). Furthermore, it can be made possible in particular that the command B2 can be optimized and thus a process as a whole can be optimized, in particular so that requirements can be met.

Algorithms Ai can in particular be machine learning algorithms. In particular, all types of machine learning algorithms can (conceivably) be used. Depending on the choice of algorithms, the types of intermediate results Oi may be restricted. In particular, if each algorithm Ai receives the data time series for a known robot command, the type and size of the data time series can be estimated in advance. In particular, in one embodiment neural networks can thereby make it possible for the algorithms Ai to only need to be retrained for a new command in a new process. In particular, this can reduce the data load of the (overall) algorithm.

In particular, the same type of algorithm can be used for all Ai and in particular can be determined only for (certain) sizes of data time series and/or certain command classes, which can in particular be pre-trained.

In particular, the task of the Ai can be similar in each case, as in particular for the same commands Bi. In one embodiment, this makes it possible to use weight sharing in particular for the neural networks. In particular, dependencies of the commands can also be learned by a recurrent neural network.

In particular, all machine learning methods can be used for $A_G$. In particular by preprocessing in the first layer, such as determining an intermediate result Oi, methods can be used for the second layer that model less complex relationships but offer better-interpretable results, such as decision trees or Bayesian learning methods.

If neural networks are used for the algorithms Ai and $A_G$, in particular at least one neural network is used for (Ai+$A_G$) with (i=1 to n), these can be trained together by backpropagation, in particular via the intermediate results Oi. This can enable the entire hierarchy to be trained together. However, transfer learning can also be made possible, particularly through pre-training and/or fine-tuning of the Ai algorithms, or also through other processes.

Figure 2:
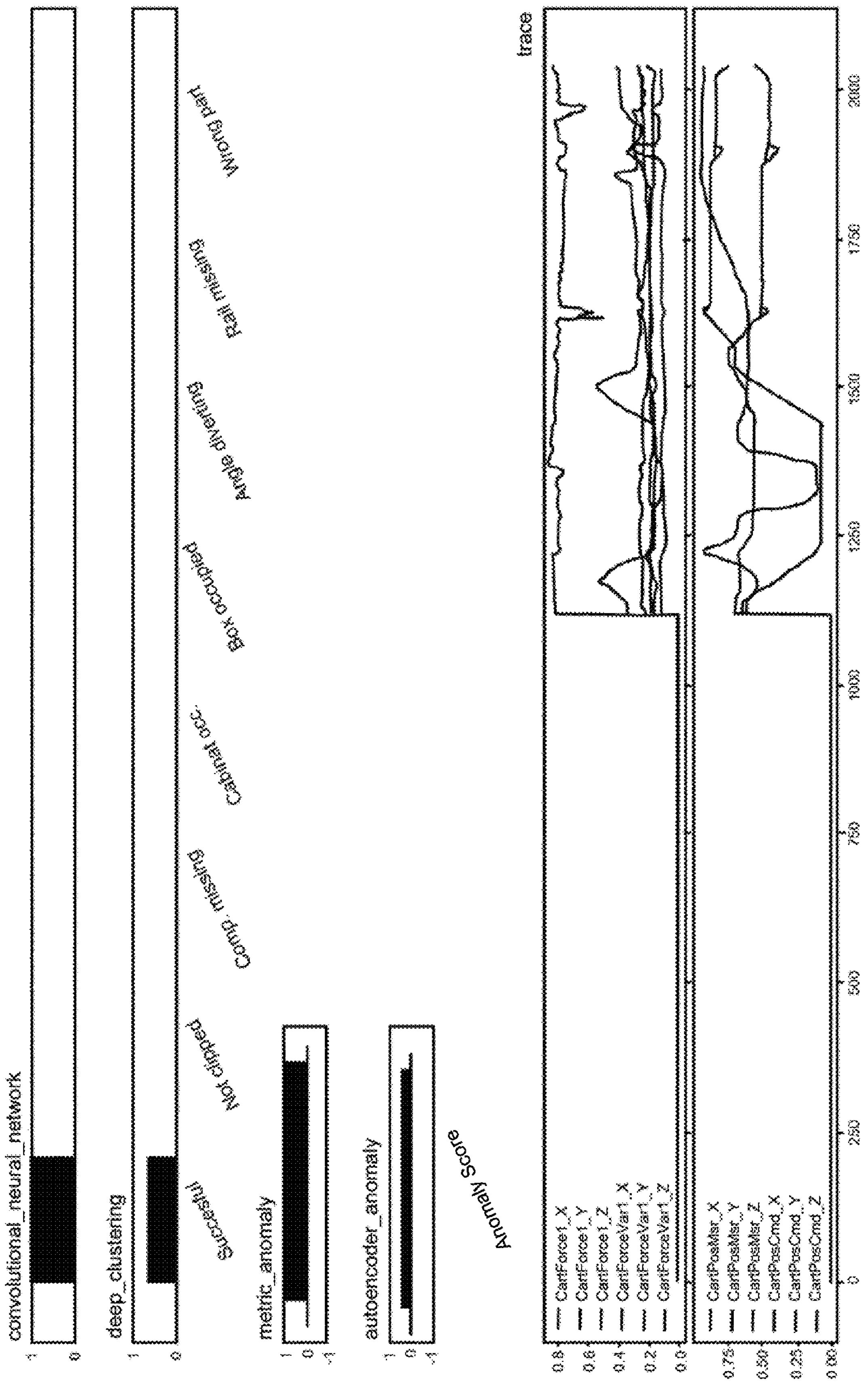
FIG. 2 schematically illustrates exemplary data time series of a process with exemplary labels.

FIG. 2 shows a schematic representation of a result based on exemplary data time series Zi. In the lower region, various data time series for different parameters are shown as examples, here with position and force data time series as examples. In the middle part of FIG. 2, an anomaly detection is shown as an example, and in the upper third of FIG. 2 an exemplary result for an estimation (evaluation) of the data time series Zi is shown. FIG. 2 shows examples of process labels, such as "successful," "not clipped," "component missing," "cabinet occupied," "box occupied," "angle diverting," "rail missing," and "wrong part." Other process labels are possible, or other process labels can be prespecified. The process shown here as an example has the result "successful."

Figure 3:
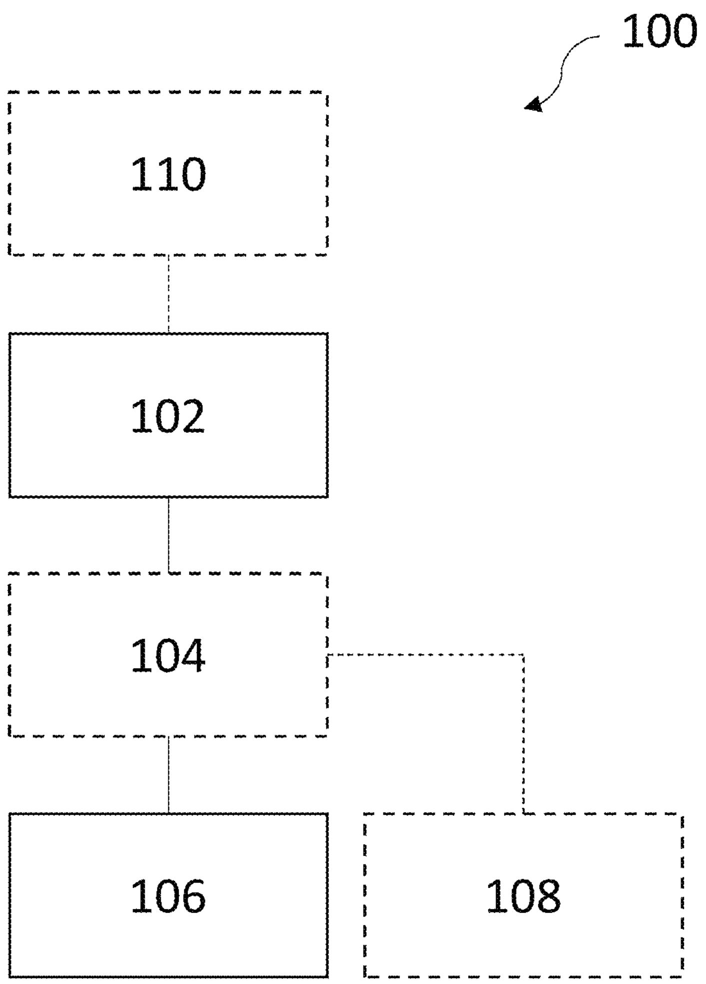
FIG. 3 depicts a method according to an embodiment of the present disclosure.

FIG. 3 schematically shows a method 100 for evaluating and/or monitoring a process, in particular a robotic process. 102 represents in particular the detection of at least one data time series. 104 represents in particular the determination of an intermediate result. 106 represents in particular the determination of a result. In particular, 108 schematically shows the analysis of an intermediate result and the determination of an anomaly result. 110 relates to the decomposition of an overall data time series into data time series. The method steps shown in dashed lines are optional method steps which apply depending on the case. In particular, if data time series can be detected for each command, there is no need to decompose the data time series or the overall data time series into data time series that are assigned to a process command. Furthermore, an algorithm can use an intermediate result "interally," in particular in a way in which the intermediate result is not presented or published in an interpretable manner. In particular, there is then no "transfer" of the intermediate result to another algorithm or to a first algorithm. Furthermore, anomaly detection can be a useful addition to the method, but a result can in particular be determined without anomaly detection.

In particular, a command Bi, as described in the examples, can also refer to a sequence of commands for which a data time series Zi is detected.

Although embodiments have been explained in the preceding description, it is noted that a large number of modifications are possible. It is also noted that the embodiments are merely examples that are not intended to restrict the scope of protection, the applications, and the structure in any way. Rather, the preceding description provides a person skilled in the art with guidelines for implementing at least one embodiment, various changes—in particular with regard to the function and arrangement of the described components—being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

100 Method
110 Decomposing an overall data time series
102 Detecting at least one data time series
104 Determining an intermediate result
106 Determining a result
108 Determining an anomaly result
$A_G$ Part of an algorithm or first algorithm
Ai: A1 to An Other part of an algorithm or second algorithm
Adi: Ad1 to Adn Anomaly detection algorithm
Bi: B1 to Bn Commands
Oi: O1 to On Intermediate result
Zi: Z1 to Zn Data time series
Z Overall data time series
y Process label
Y Result

What is claimed is:

1. A method for evaluating or monitoring a robotic process, comprising:
detecting with a robot controller at least one data time series, wherein:
the at least one data time series describes at least one parameter of the process,
the data time series is created by the process, which process executes a process program with process commands, and
the at least one data time series is assigned to a part of the process program;
determining with the robot controller a result using a first algorithm, or at least a part of the algorithm, based on the at least one data time series, wherein:
the result describes a state of the process, and
the result is assignable to the part of the process program;
determining an intermediate result with the at least one part of the algorithm, or by at least one other part of the algorithm, based on the at least one data time series;
wherein the at least one part of the algorithm or the at least one other part of the algorithm or a second algorithm receives the at least one data time series;
wherein the intermediate result is an interpretable intermediate result or an uninterpretable intermediate result; and
wherein the intermediate result describes an assignment to a predetermined process label.

2. The method of claim 1, wherein the part of the process program to which the at least one data time series or the result is assigned is a process command or a part of the process commands of the process program.

3. The method of claim 1, wherein:
determining the result by the first algorithm or by the at least one part of an algorithm is further or alternatively based on the intermediate result; and
the first algorithm or the at least one part of an algorithm further or alternatively receives the intermediate result.

4. The method of claim 1, wherein:
the second algorithm is a machine learning algorithm; and
machine learning comprises training the second algorithm on the process label based on the at least one data time series to determine an intermediate result.

5. The method of claim 1, wherein:
the first algorithm is based on machine learning; and
machine learning comprises training the first algorithm on the process labels with the intermediate result of the at least one other part of the algorithm or of the second algorithm.

6. The method of claim 1, wherein the at least one data time series is selected from an overall data time series of the process.

7. The method of claim 1, further comprising:
analyzing the intermediate result using an anomaly detection algorithm; and
determining an anomaly result;
wherein the anomaly result describes an error in the execution of the part of the process program.

8. The method of claim 7, wherein the error is an error in the execution of the process command or the part of the process commands of the process program.

9. The method of claim 1, further comprising at least one of:
outputting at least one of the result or the intermediate result via a user interface;
evaluating the process based on at least one of the intermediate result or the result; or
controlling the robotic process based on at least one of the intermediate result or the result.

10. The method of claim 9, wherein outputting comprises representing at least one of the result or the intermediate result in a flow chart of the process.

11. The method of claim 10, wherein representing at least one of the result or the intermediate result comprises graphically representing at least one of the result or the intermediate result.

12. The method of claim 9, wherein at least one of the detection or the determination of at least one of the result, the intermediate result, or an anomaly result of the at least one data time series is carried out at least one of centrally or decentrally.

13. A computer program product for evaluating or monitoring a robotic process, the computer program product comprising program code stored in a non-transitory, computer-readable medium, the program code, when executed a computer, causing the computer to carry out the method of claim 1.

14. A method for evaluating or monitoring a robotic process, comprising:
detecting with a robot controller at least one data time series, wherein:
the at least one data time series describes at least one parameter of the process,
the data time series is created by the process, which process executes a process program with process commands, and
the at least one data time series is assigned to a part of the process program;
determining with the robot controller a result using a first algorithm, or at least a part of the algorithm, based on the at least one data time series, wherein:
the result describes a state of the process, and
the result is assignable to the part of the process program;
detecting an overall data time series in response to a failure to detect the at least one data time series with an assignment to a process command or process commands; and
decomposing the detected overall data time series into data time series using a decomposition algorithm, wherein the overall data time series describes at least one parameter of the process and is created by the process, which process executes a process program with process commands.

15. The method of claim 14, wherein the decomposition algorithm is a machine learning algorithm.

16. A system for identifying error causes in a robotic process, the system comprising:

means for detecting at least one data time series, wherein:

the at least one data time series describes at least one parameter of the process, the data time series is created by the process, which process executes a process program with process commands, and the at least one data time series is assigned to a part of the process program;

means for determining a result using a first algorithm, or at least a part of the algorithm, based on the at least one data time series, wherein:

the result describes a state of the process, and the result is assignable to the part of the process program;

means for detecting an overall data time series in response to a failure to detect the at least one data time series with an assignment to a process command or process commands; and means for decomposing the detected overall data time series into data time series using a decomposition algorithm, wherein the overall data time series describes at least one parameter of the process and is created by the process, which process executes a process program with process commands.

* * * * *